United States Patent [19]

Slawson

[11] Patent Number: 5,617,721

[45] Date of Patent: Apr. 8, 1997

[54] EXHAUST CATALYST PREHEATER WITH FLAME IGNITER AND SENSOR ELEMENT

[75] Inventor: Robert L. Slawson, Burton, Mich.

[73] Assignee: General Motors Corporation, Detroit, Mich.

[21] Appl. No.: 514,530

[22] Filed: Aug. 14, 1995

[51] Int. Cl.⁶ ..................................................... F01N 3/28
[52] U.S. Cl. ................................ 60/277; 60/284; 60/286; 60/300
[58] Field of Search ........................... 60/277, 284, 286, 60/300

[56] References Cited

U.S. PATENT DOCUMENTS

| | | | |
|---|---|---|---|
| 3,661,533 | 5/1972 | David et al. | |
| 3,663,150 | 5/1972 | Hapgood | 431/66 |
| 4,581,891 | 4/1986 | Usui | 60/286 |
| 4,608,232 | 8/1986 | Sunano | 73/23 |
| 4,871,307 | 10/1989 | Harris | 431/25 |
| 5,153,673 | 10/1992 | Amirav | 356/315 |
| 5,253,475 | 10/1993 | Kabasin | 60/300 |
| 5,339,630 | 8/1994 | Pettit | 60/303 |
| 5,472,337 | 12/1995 | Guerra | 431/78 |

*Primary Examiner*—Douglas Hart
*Attorney, Agent, or Firm*—Cary W. Brooks

[57] ABSTRACT

The present invention is directed to an exhaust catalyst fuel fired preheater including a combination flame igniter and flame sensor element. A glow-plug igniter and an ion flame detector placed on the same flat plate element. The glow-plug igniter is utilized to selectively ignite the liquid fuel being delivered to the preheater. The ion flame detector is utilized to detect ionized particles that are present if the burner has an ignited flame.

1 Claim, 4 Drawing Sheets

EXHAUST CATALYST PREHEATER WITH FLAME IGNITER AND SENSOR ELEMENT

FIELD OF THE INVENTION

This invention relates to internal combustion engine exhaust treatment apparatus, and in particular, to a liquid fuel fired catalytic converter preheater with a combination flame igniter and flame sensor element.

BACKGROUND OF THE INVENTION

Advancement in emission technologies for internal combustion engines has resulted in significantly lowered total engine emissions. In general, automotive emissions applications employ an exhaust mounted catalytic treatment device for reducing regulated exhaust constituents such as hydrocarbons (HC), carbon monoxide (CO), and oxides of nitrogen ($No_x$) in the engine exhaust prior to their release to the atmosphere. The catalyst treatment devices, or catalytic converters, rely on the heat of the exhaust gas to become catalytically active following a cold start. Initiation of catalyst activity occurs at the light-off temperature and is typically in the area of 400° C. A vehicle may require 75–100 seconds or more of engine operation before the exhaust supplies sufficient heat to reach catalyst light-off. Accordingly, in order to reduce cold-start emissions, it is desirable to provide an additional heat source at, or shortly after, engine start-up which will promote faster heating of the converter and, therefore, a shorter time to optimal catalyst efficiency.

Several technologies have been considered for the preheating of catalytic converters. Electrically heated converters, which use an engine driven electrical system to heat elements in the converter or the catalyst support itself, in the case of metal supports, have been proposed. The heat output of the electrically heated units is directly related to the electrical input. In order to achieve the desired, rapid heating of the catalyst support, significant power must be supplied by the electrical system.

Liquid fuel fired preheaters, to which the present invention is directed, have been considered for achieving rapid heating. Although not suffering from the drawbacks of electrically heated units, such systems require a burner, a fuel system, and an ignition system along with the related complexity and packaging problems associated with such systems. In addition, a reliable ignition for the burner has been problematic.

SUMMARY OF THE INVENTION

The present invention is directed to an exhaust catalyst fuel fired preheater including a combination flame igniter and flame sensor element. A glow-plug igniter and an ion flame detector are placed on the same flat plate element. The glow-plug igniter is utilized to selectively ignite the liquid fuel being delivered to the preheater. The ion flame detector is utilized to detect ionized particles that are present if the burner has an ignited flame.

These and other objects, features and advantages of the present invention will become apparent from the following brief description of the drawings, detailed description and appended claims and drawings.

DETAILED DESCRIPTION

Figure 1:
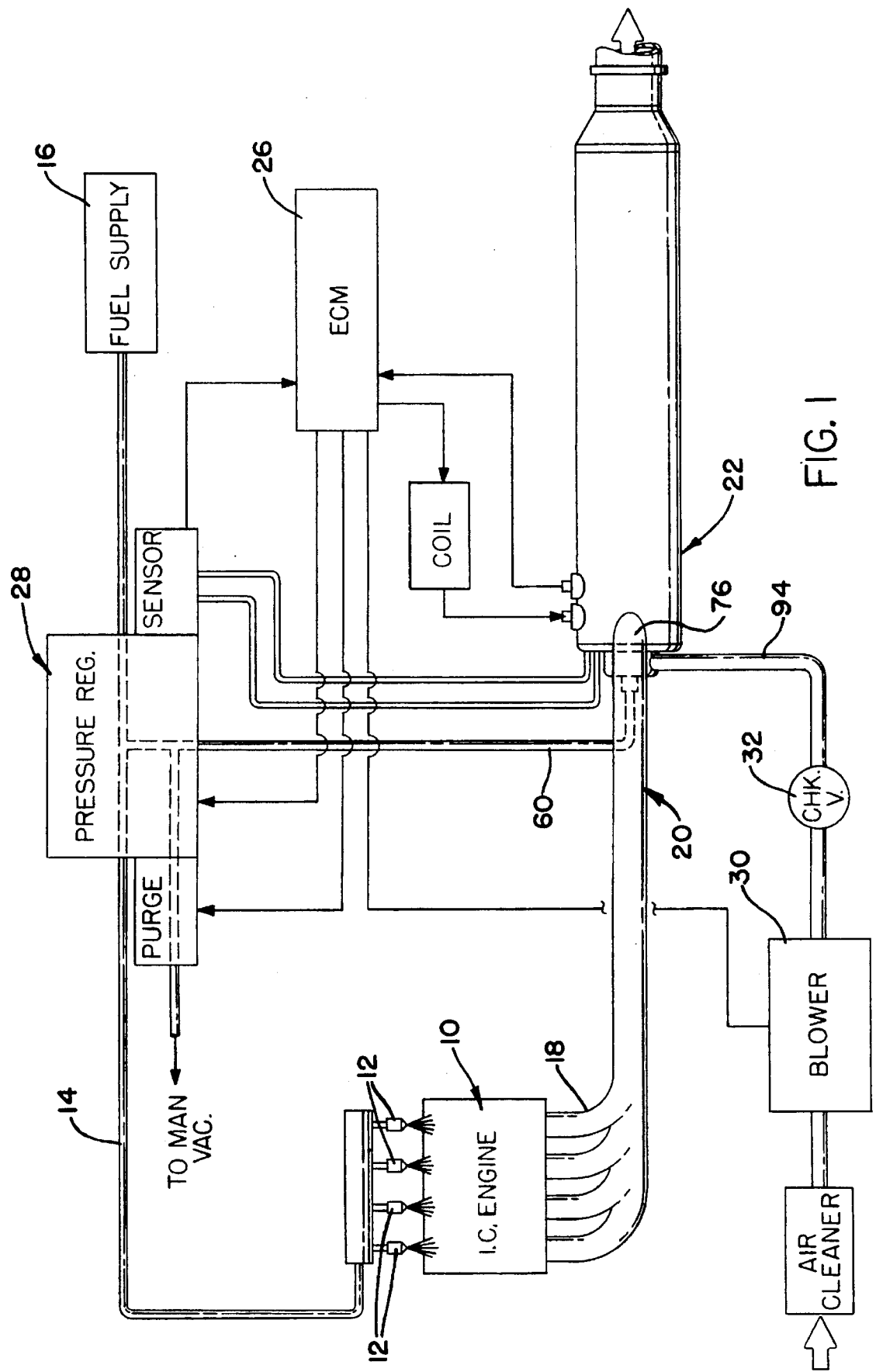
FIG. 1 is a schematic view of an internal combustion engine system including an exhaust catalyst fuel heated preheater according to the present invention.

FIG. 1 schematically illustrates a typical automotive installation of the present invention. An internal combustion engine system comprises an engine 10 having a fuel system which includes a means for delivery of fuel to the engine such as injectors 12, a fuel line 14 for delivery of fuel to the injectors 12, and a source such as a fuel tank 16 from which pressurized fuel is obtained. Fuel and air are combusted in the engine 10 and are exhausted through manifold 18 to an exhaust system, designated generally as 20.

Figure 2:
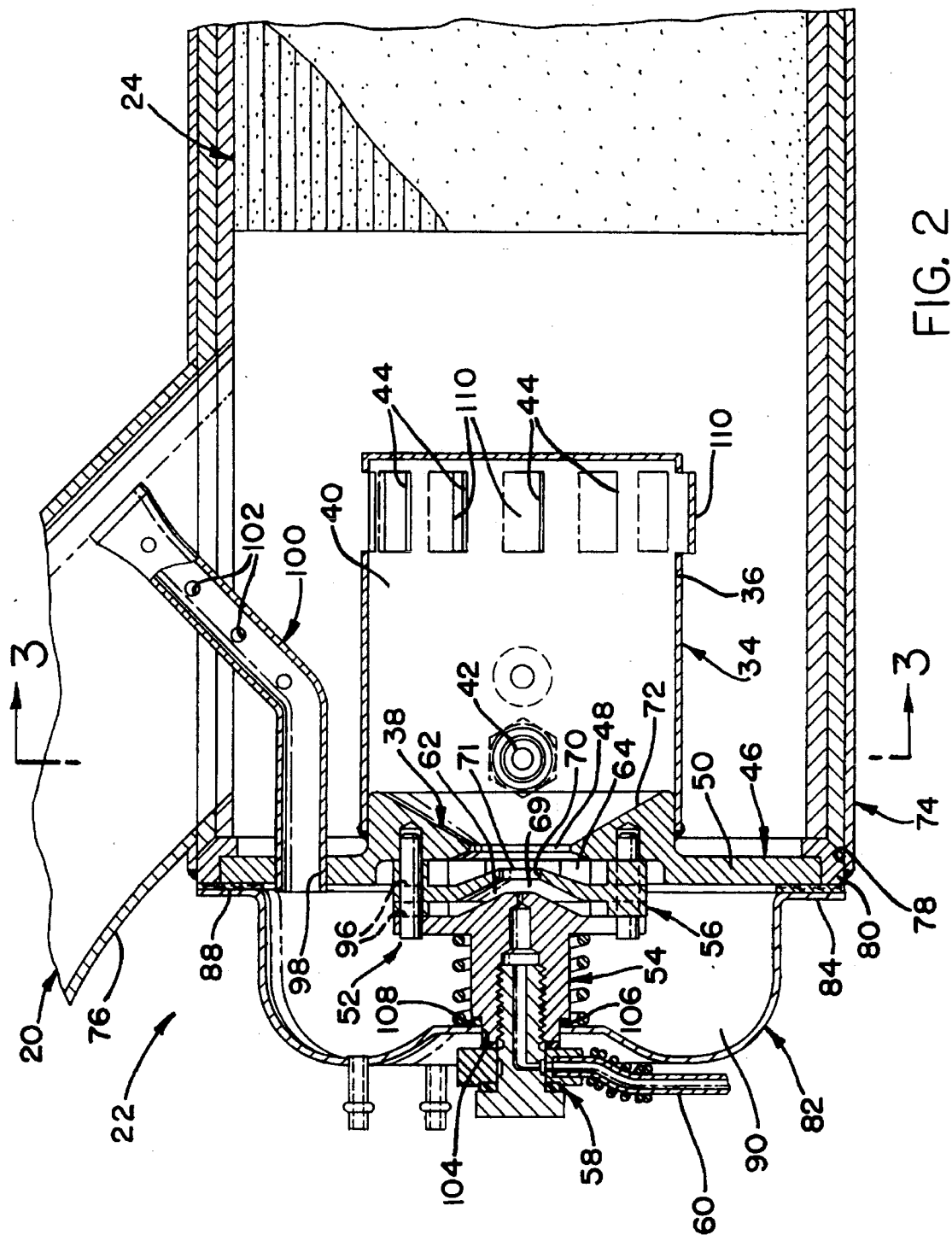
FIG. 2 is a sectional, side view of an exhaust burner catalyst preheater of the present invention.
Figure 3:
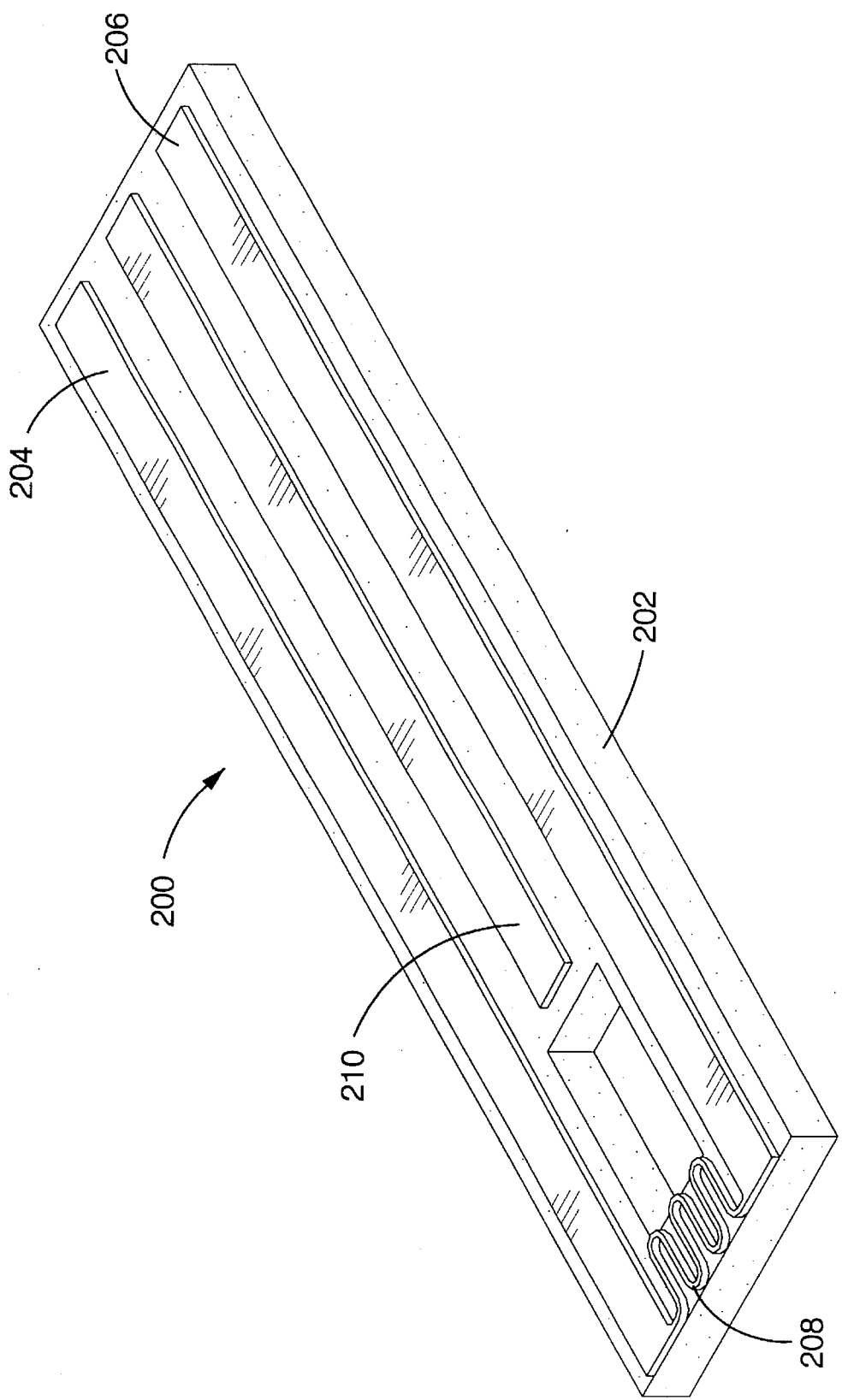
FIG. 3 is an enlarged view of a combination flame igniter and flame sensor element according to the present invention.

The exhaust system 20 comprises a burner assembly 22 and a catalytic converter 24, see FIG. 2. The converter 24, which operates to reduce the level of undesirable exhaust constituents which exit the exhaust system, must be operated above a particular temperature, referred to as the light-off temperature, to achieve optimal performance. In order to reduce the time required for the converter 24 to reach the light-off temperature, the burner 22 is located so that its output is mixed with the exhaust gas upstream thereof. The burner 22 is operated for a short time following engine start-up to heat the exhaust gas thereby contributing to the heat available in the exhaust gas which is available to heat the converter 24.

An electronic controller 26 controls fuel and air supplied to the burner by fuel metering assembly 28 and blower or air pump 30, respectively. Fuel meter 28 regulates fuel from supply 16 to a desired pressure and flow rate which is consistent with the goals of the burner control strategy. The fuel meter 28 may be a pulse-width modulated injector or electronic fuel regulator capable of continually modulating fuel supply to a predetermined input duty cycle. A preferred embodiment of such a metering device is described in application U.S. Ser. No. 07/909,488 filed Jul. 6, 1992, and assigned to the assignee of the present application. Similarly, combustion air is supplied to the burner 22 via an engine driven or electrical air pump 30. The air supply is regulated to a predetermined pressure, also consistent with burner control strategy. A check valve 32, disposed between the burner 22 and the blower 30, provides protection to the blower from exhaust gas during period of inoperation.

Referring to FIG. 2, burner assembly 22 comprises a primary combustor assembly 34. A principle component of the primary combustor assembly 34 is combustor tube 36, an axially extending tube having a combustor head 38 located at a first end, a combustion chamber 40 with ignition means 42, and a series of burner outlets 44 located at the second end thereof. The combustor head 38 includes a base member 46, fixed to, and closing the first end of combustor tube 36. The base member has a throughbore 48 which opens into the combustion chamber 40, and a flange member 50 extending outwardly from the primary combustor tube 36 about the perimeter of the base member. U.S. Pat. No. 5,339,630 issued Aug. 23, 1994, the disclosure of which is hereby incorporated by reference, provides a suitable exhaust catalyst preheater system. However, this system does not include the combination flame igniter and flame sensor element according to the present invention which is hereafter described.

The combination flame igniter and flame sensor element 200 is provided on a flat plate type substrate 202 which preferably is made from alumina. The flame igniter is of the glow-plug type and is provided by a positive conductor 204 printed along one edge of the substrate and a negative conductor 206 printed along the opposite edge of the substrate. A resistive pattern 208 is printed near one end of the substrate and connects the positive conductor 204 and the negative conductor 206. The resistive pattern 208 provides enough heat to ignite the liquid fuel from the burner. An ion detector conductor 210 is printed down the middle of the substrate. A potential is applied to the ion detector conductor. When the preheater is not ignited, there is infinite resistance to current flow from the ion detector conductor due to air. However, when the preheater is ignited, ionized particles in the flame will draw a current from the ion detector conductor. Accordingly, the ion detector can be utilized to determine whether flame is present in the preheater or if there is a malfunction such as a fouled flame igniter. The glow-plug conductors and the ion detector conductor can be printed from inks known to those skilled in the art, and preferably are printed from platinum-based inks.

Figure 4:
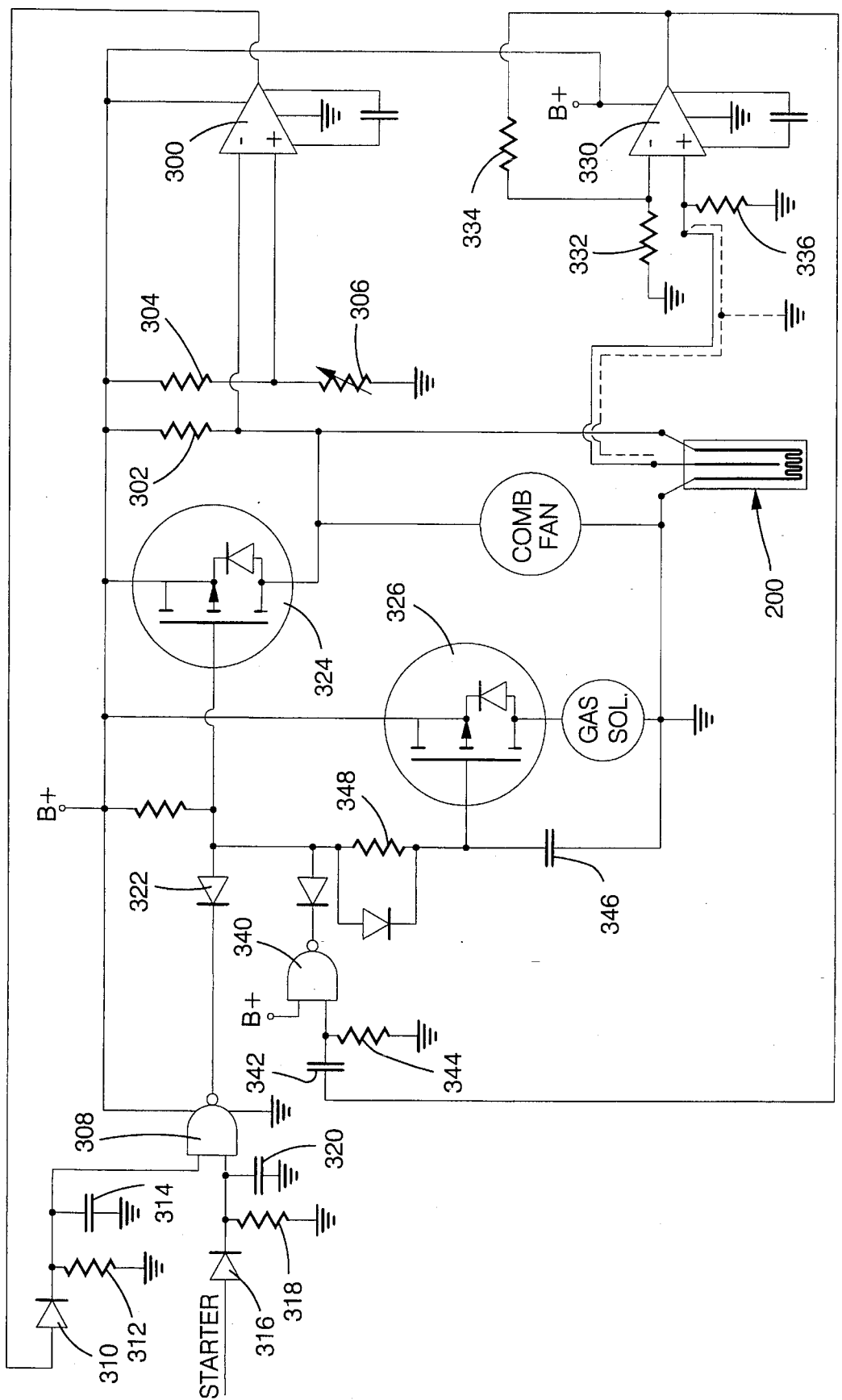
FIG. 4 is a schematic illustration of a control circuitry for the combination flame igniter and flame sensor element according to the present invention.

Referring now to FIG. 4, cold exhaust temperature is detected by comparator 300 and bridge circuit consisting of 302, 304, 306 and the resistance of sensor 200 (below 2Ω cold). This circuit sends a digital high signal to the NAND gate 308 exhaust cold input vis-a-vis diode 310, resistor 312 and capacitor 314. A digital high signal is then sent to the starter input of NAND gate 308 vis-a-vis diode 316, resistor 318 and capacitor 320 when the vehicle starter is energized. Both of these inputs are configured for 3 second holds after removal of their signal resulting in a 3 sec. low output through diode 322 to the igniter/sensor/air fan control transistor 324 and delayed gas solenoid transistor 326. The logic of this part of the circuit is if the starter is actuated and the exhaust temperature is cold the fan and igniter are energized and after a 2 second delay the gas solenoid is actuated. At this time the igniter will be hot and ignition will occur.

The flame detector circuit of A3, an ion amplifier with a gain of 100, comprising amplifier 330 and resistors 332, 334 and 336 outputs a high signal vis-a-vis capacitor 342 and resistor 344 to NAND gate 340 which will hold the control transistors on even though start gate 308 times out and shuts down. The fuel fired preheater flame will remain on for a time set by capacitor 346 and resistor 348 (10 seconds as configured), or will shut the system down if a flameout occurs for any reason and will not actuate at all if a flame does not occur. Actual gas on time if no ignition occurs (about 1 second as designed), is the difference between when the start gate resets and the gas solenoid control resets.

What is claimed is:

1. A combustion engine exhaust catalyst preheater comprising:

a combustor tube having an open outlet end for exhausting an exhaust gas stream;

a fuel nozzle connected to said combustor tube for discharging fuel inside of the tube;

an opening in said tube for supplying combustion air;

a combination flame igniter and flame sensor connected to said combustor tube for igniting fuel discharged from said fuel nozzle and for detecting the presence of a flame within the combustor tube, said combination flame igniter and flame sensor comprising a flat plate substrate having a first conductor printed near a first edge of the substrate and a second conductor printed near an opposite edge of the substrate, and a resistive pattern printed between and connecting the first and second conductors, said first and second conductors and resistive pattern being operatively connected to a current source;

a third conductor printed between the first and second conductors, and a control circuitry operatively connected with the third conductor so that for applying a potential to the third conductor, and detecting current draw through the third conductor to determine the presence of a flame in the combustor tube.

* * * * *